Figure 1:
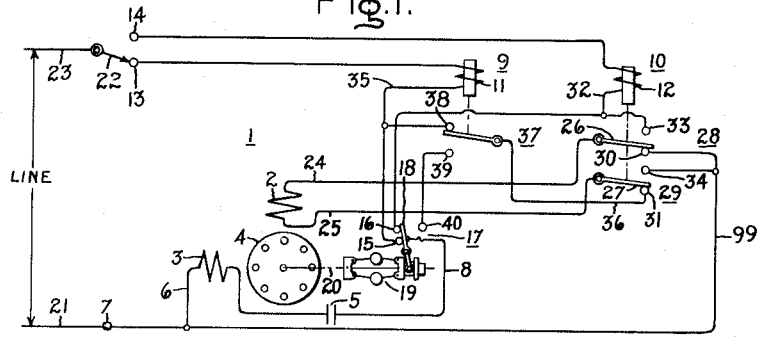

July 28, 1953  D. C. REEK  2,647,230
INSTANTLY REVERSIBLE MOTOR
Filed May 7, 1952

Inventor:
Donald C. Reek,
by Prowell & Mack
His Attorney.

Patented July 28, 1953

2,647,230

UNITED STATES PATENT OFFICE 2,647,230

INSTANTLY REVERSIBLE MOTOR

Donald C. Reek, Fort Wayne, Ind., assignor to General Electric Company, a corporation of New York Application May 7, 1952, Serial No. 286,471

12 Claims. (Cl. 318—203)

This invention relates to single-phase alternating current motors and more particularly to motors of this type having provision for instant reversal with only three external terminals being required.

Single-phase alternating current motors which can be instantly reversed are frequently required for such applications as hoists, door-openers, and other types of actuating mechanisms. In the design of a circuit to provide instant reversal of a single-phase alternating current motor, it is desirable that instantaneous switching from one direction of rotation to the other be provided and that a minimum number of external terminals be required so that the motor may be reversed by means of a single-pole double-throw switch; conventional motor reversal circuits having often required the use of a multipole reversing switch and a large number of leads from the switch to the motor.

An object of this invention is therefore to provide an instantly reversible single-phase alternating current motor requiring only three external leads.

Further objects and advantages of this invention will become apparent and the invention will be better understood by reference to the following description and the accompanying drawing, and the features of novelty which characterize this invention will be pointed out with particularity in the claims annexed to and forming a part of this specification.

In its broadest aspects, this invention provides a single-phase alternating current motor having a running winding and a starting winding circuit including a starting winding and a reactive device, such as a capacitor, connected in series with the starting winding for electrically displacing the starting and running windings to provide a rotating field for starting the motor. One end of the starting winding circuit is adapted to be connected to one side of a source of alternating current and a pair of relay circuits are provided each including a relay with a serially connected operating coil circuit. These relay circuits are respectively arranged to be connected to the other end of the starting winding circuit and are adapted to be selectively connected to the other side of the source of alternating current so that the operating coil of the relay so selected and the starting winding circuit are serially connected across the source of alternating current. Switch means, such as a speed-responsive switch, is arranged in the starting winding circuit to open this circuit responsive to a predetermined motor operating characteristic, such as speed. Each of the relays has contacts arranged to connect the running winding and the operating coil of the selected relay circuit in circuit with the other side of the source of alternating current so that the operating coil of the selected relay is energized after the switch opens the starting winding circuit. The relays also have contacts arranged to connect at least one of the windings in a regenerative braking circuit when neither of the relay operating coils is energized and the switch is open so that the braking circuit is established when a change in selection of relay circuits is made to reverse the motor while the motor is running. The relay contacts connect one of the windings in one sense when one of the relay operating coils is energized and in the other sense when the other relay operating coil is energized to effect reversal of the motor. Thus, when one of the relay circuits is selected, the starting winding circuit is initially energized and the picking up of the relay in the selected relay circuit causes the running winding to be energized so that the motor starts. When a preselected speed is reached, the switch opens the circuit of the starting winding. However, the running winding is still connected in circuit with the relay of the selected circuit so that the relay remains picked up. If the selector switch is moved to select the other relay circuit, i. e., to reverse the motor while the motor is running in one direction, the first relay will drop out. However, the second relay will not pick up since the speed-responsive switch in the starting winding circuit is still open. A regenerative braking circuit is thus established to rapidly plug the motor to a stop. As soon as the motor speed falls below the preselected speed, the switch in the starting winding circuit will close, thus causing the relay of the now-selected relay circuit to pick up again, connecting the running winding. The motor will thus be rapidly brought to a stop and will start up again in the opposite direction.

Figure 2:
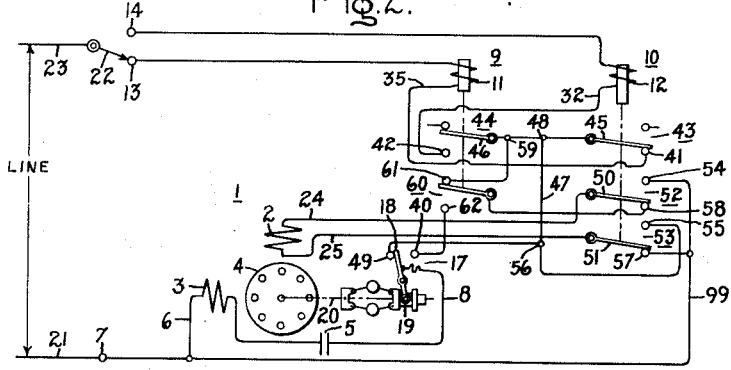
Figure 3:
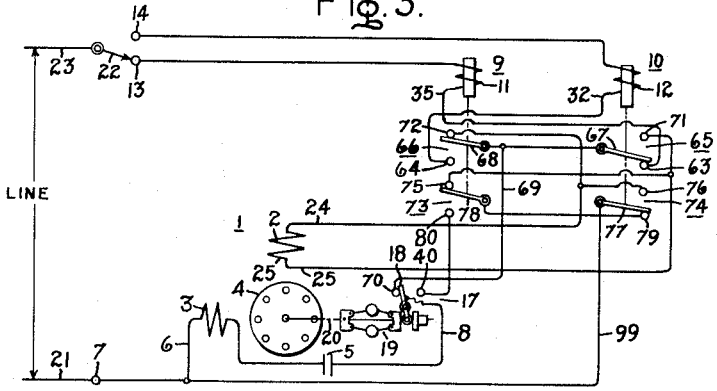
Figure 4:
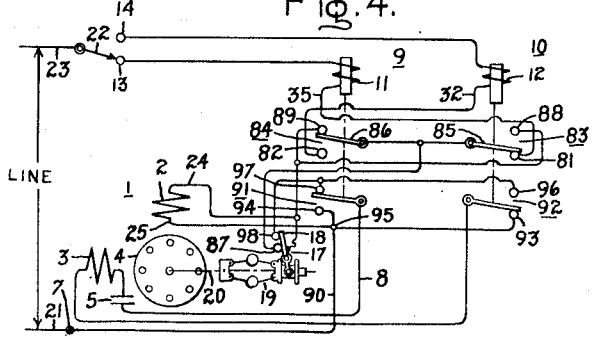

In the drawing, Fig. 1 is a schematic illustration of one form of the improved instantly reversible motor circuit of this invention; Fig. 2 is another schematic illustration of a modified form of the instantly reversible motor circuit of this invention; Fig. 3 schematically illustrates still another form of this invention; and Fig. 4 is a schematic illustration of a further form of this invention.

Referring now to Fig. 1, there is shown a single-phase alternating current induction motor 1 having a running winding 2, a starting winding 3 and a squirrel cage rotor 4. The circuit of the starting winding 3 includes a serially connected capacitor 5 which electrically displaces the running winding 2 and the starting winding 3 to provide a rotating field for starting the motor. The end 6 of the starting winding circuit is connected to a first external terminal 7 and the other end 8 is connected in the manner to be hereinafter described. A pair of current-responsive relays 9 and 10 are provided having operating coils 11 and 12 respectively connected to external terminals 13 and 14. The other ends of the relay operating coils are respectively connected to stationary contacts 15 and 16 of switch 17, the movable element 18 of the switch being connected to the end 8 of the starting winding circuit. The switch 17 is preferably arranged for actuation by a speed-responsive device 19, such as a centrifugal mechanism on the shaft 20 of the rotor 4. The external terminal 7 is adapted to be connected to one side 21 of a suitable source of single-phase alternating current while the terminals 13 and 14 are arranged to be selectively connected by a suitable selector switch 22 to the other side 23 of the source of alternating current. It will thus be readily seen that starting at rest, with the switch 22 moved to connect the terminal 13, the operating coil 11 of the relay 9 and the starting winding circuit including the starting winding 3 and the capacitor 5 will be connected in series across the source of alternating current, thus energizing the operating coil 11 of relay 9 and the starting winding 3 through the stationary contact 15 and movable contact 18 of speed-responsive switch 17.

In order to provide for energization of the running winding 2 and reversal of the connections thereof to provide for reversal of the motor, the ends 24 and 25 of running winding 2 are respectively connected to movable elements 26 and 27 of contacts 28 and 29 associated with relay 10. The contact 28 has a first position 30 and the contact 29 has a first position 31 which respectively connect the end 24 of the running winding 2 to the external terminal 7 through line 99 and the end 25 of the running winding 2 to the end 35 of the operating coil 11 of relay 9 through line 36. Contact 37 of relay 9 is arranged in the line 36 with its first position 38 closing the circuit when the relay is energized. Thus when the switch 22 connects the external terminal 13 with the motor at rest, the operating coil 11 of relay 9 and starting winding 3 will be energized through the speed responsive switch 17 thus picking up the relay 9 to close the contact 37 to the position 38. This connects the running winding 2 between the side 35 of operating coil 11 of relay 9 and the external terminal 7 so that the running winding 2 and the operating coil 11 of relay 9 will remain energized after the switch 17 opens the starting winding circuit as will be hereinafter described.

The contacts 28 and 29 of relay 10 are also respectively provided with second positions 33 and 34 which contact the running winding 2 in the opposite sense for operating the motor in the reverse direction. Thus position 33 of contact 28 connects the end 24 of running winding 2 to the end 32 of operating coil 12 of relay 10 while position 34 of contact 29 connects the end 25 of running winding 2 to the external terminal 7 through line 99. Thus it can be seen that when the selective switch 22 contacts the external terminal 14, the operating coil 12 of relay 10 will be initially energized by virtue of its connection with the starting winding circuit and the relay 10 will pick up connecting the running winding 2 between the operating coil 12 of relay 10 and the external terminal 7 in the reverse sense from the connection when the relay 9 is energized. The contact 37 of the relay 9 has a second position 39 connected to running contact 40 of the speed responsive switch 17.

In operation, with the motor at rest, throwing the switch 22 to either position, depending upon the direction of rotation desired, starts the motor. Thus, assuming the switch 22 has been moved to connect external terminal 13, as shown in Fig. 1, instantaneous locked rotor current will flow from the line 23 through the switch 22, the operating coil 11 of relay 9, through the stationary contact 15 and movable element 18 of the speed-responsive switch 17, through the capacitor 5 and starting winding 3 to the external terminal 7 and the other side of the line 21. At this point, neither relay is picked up so that the running winding 2 is not energized. Relay 9 will now pick up causing contact 37 to close to position 38 and since relay 10 will not be picked up so that the contacts 28 and 29 will be in their positions 30 and 31, a second circuit is established from line 23 through the switch 22, the relay operating coil 11, the contact 37, contact 29, running winding 2, and contact 28 to the external terminal 7 on the other side of the line 21. Thus, both the running winding 2 and the starting winding 3 of the motor will be energized and the motor will start and come up to speed. When the cutout speed of the centrifugal mechanism 19 is reached, the switch 17 will open moving to its running position 40, thus removing the starting winding from the circuit. The motor is now running normally on its main winding with the relay 9 still picked up by virtue of the current in the running winding 2 still traversing the operating coil 11. If the switch 22 had been thrown to the terminal 14, the same sequence of operation would have been obtained except the relay 10 would have picked up rather than the relay 9 and the running winding 2 would have been connected in the opposite sense.

In order to reverse the motor when it is running, the selector switch 22 is moved to the opposite position and referring again to Fig. 1, it is assumed that the switch 22 is moved to the terminal 14. There is now no circuit from line 23 to line 21 since the circuit of the operating coil 11 of relay 9 has now been opened. In order for the operating coil 12 of relay 10 to be energized, the contacts 28 and 29 must be in positions 33 and 34, which is not the case since the relay is not picked up, or the speed-responsive switch 17 must be closed so that the movable element 18 contacts the stationary contact 16, which is not the case since at the moment of throwing the switch 22 to the other position 14, the motor is running above the predetermined speed. Since operating coil 11 of relay 9 is now de-energized, the relay drops out moving contact 37 to its second position 39. A circuit is now established which causes regeneration in the motor causing it to brake back to the cut-in speed of the switch 17. Starting with the end 6 of the starting winding circuit, this regenerative braking circuit goes through the running contact 40 of the switch 17, the contact 37 in its second position 39, the contact 29 in its first position 31, the running winding 2, the contact 28 in its first position 30, and starting winding 3 and the capacitor 5 back to the end 8. When the motor slows down to the cut-in speed of the centrifugal mechanism 19, the switch 17 will close opening the regenerative braking circuit and energizing the operating coil 12 of relay 10 and the starting winding 3, since the movable element 18 of the switch 17 now contacts the stationary contact 16 connected to the operating coil 12. The relay 10 will now pick up moving contacts 28 and 29 to their second positions 33 and 34 connecting running winding 2 between the operating coil 12 and the terminal 7 in the reverse sense from its connection when the relay 9 was picked up. This circuit starts with the line 23, proceeds through the switch 14, the operating coil 12 of relay 10, contact 28 in its position 33, running winding 2, contact 29 in its position 34 to external terminal 7 and the other side of the line 21. The motor reversal is now completed, and the motor will come up to speed in the opposite direction. When the cut-out speed of the mechanism 19 is again reached, the switch 17 opens, moving to its running position 40, again taking the starting winding 3 out of the circuit. The motor is now running normally in the opposite direction with running winding 2 and operating coil 12 of relay 10 energized.

Referring now to Fig. 2 in which like elements are indicated by like reference numerals, motor 1 is again provided with running winding 2 and starting winding 3 with capacitor 5 connected in series therewith and with end 6 of the starting winding circuit being connected to external terminal 7 which in turn is adapted to be connected to one side 21 of an external source of single-phase alternating current. A pair of relay circuits are again provided having operating coils 11 and 12 of current-responsive relays 9 and 10 serially connected to external terminals 13 and 14 which are adapted to be selectively connected to the other side 23 of the external source of single-phase alternating current by means of selector switch 22. In this arrangement, the ends 35 and 32 of operating coils 11 and 12 of relays 9 and 10 are respectively connected to positions 41 and 42 of contacts 43 and 44 associated respectively with relays 10 and 9. Thus, operating coil 11 of relay 9 is connected to contact 43 of relay 10 while operating coil 12 of relay 10 is connected to contact 44 of relay 9. The movable elements 45 and 46 of contacts 43 and 44 are connected to circuit 47, as at 48, which in turn is connected to starting contact 49 of speed-responsive switch 17 with the movable element 18 being connected to the end 8 of the starting winding circuit, the switch 17 again being actuated by speed-responsive mechanism 19 on the shaft 20 of squirrel cage rotor 4. It will thus be seen that with the selector switch 22 in the position 13, the starting winding circuit is connected in series with the operating coil 11 of relay 9 across the source of alternating current 21 and 23 through contact 43 in its position 41 and switch 17.

In order to provide for energization of the running winding 2, the ends 24 and 25 are respectively connected to movable elements 50 and 51 of contacts 52 and 53 associated with relay 10. The first position 57 of contact 53 is connected to external terminal 7 through line 99 and the first position 58 of contact 52 is connected to the circuit 47 as at 59, with contact 60 in its first position 61 being arranged to complete the connection between the position 58 of contact 52 and the connection 59. The second position 54 of the contact 52 is also connected to the external terminal 7 through line 33 and the second position 55 of contact 53 is connected to the circuit 47 as at 56. The contact 60 has a second position 62 connected to running contact 40 of switch 17.

In operation, with the motor at rest and with the selector switch 22 thrown to the position for the direction of rotation desired, and assuming it is thrown to position 13 as shown in Fig. 2, locked rotor current now flows instantaneously from line 23 through switch 22, operating coil 11 of relay 9, contact 43 in its first position 41, starting contact 49 and movable element 18 of switch 17, capacitor 5 and starting winding 3 to the external terminal 7 and line 21. Operating coil 11 of relay 9 will now be energized and the relay will pick up. This establishes a second circuit to energize the running winding 2 with instantaneous current again flowing from the line 23 through switch 22, operating coil 11 of relay 9, contact 43 in its position 41, contact 60 in its first position 61, contact 52 in its first position 58, the running winding 2, contact 53 in its first position 57, to the external terminal 7 and line 21. Since the running and starting windings 2 and 3 are now energized, the motor will start and come up to speed. When the cut-out speed of the mechanism 19 is reached, the switch 17 will open the starting winding circuit moving to its running contact 40 and the motor runs normally on its main winding with the relay 9 picked up. The same sequence of operations would have occurred had the switch 22 been thrown to the position 14 with the exception that the relay 10 would have been picked up and the main running winding 2 connected in the opposite sense.

In order to reverse the motor while it is running, the switch 22 is thrown to the opposite position, shown here as being position 14. When the switch is thrown, no current will flow through the operating coils 11 and 12 of relays 9 and 10 and relay 9 will drop out. Relay 10 cannot pick up at this point since it can only be energized through contacts 52 and 53 and the running winding 2, or through the switch 17 in its starting position 49 and the starting winding 3. Since relay 10 is not picked up and with the motor operating at its normal speed, the switch 17 will be open and the operating coil 12 of relay 10 will not initially be energized. Thus, with both relays dropped out, a regenerative braking circuit is established starting with the end 8 of the starting winding 3 through movable element 18 of switch 17, running contact 40, contact 60 of relay 9 in its second position 62, contact 52 of relay 10 in its first position 58, the running winding 2, contact 53 of relay 10 in its first position 57, line 99, starting winding 3 and capacitor 5 back to the end 8 of the starting winding circuit. Thus, the motor is regeneratively braked back to the cut-in speed of the mechanism 19. When the motor speed drops below this predetermined point, the mechanism 19 will close the switch 17 so that the movable element 18 contacts the starting contact 49, thus establishing a circuit to energize the starting winding with instantaneous current flowing from the line 23 through the switch 22 in its position 14, operating coil 12 of relay 10, contact 44 in its position 42, circuit 47, switch 17 in its starting position 49, capacitor 5 and starting winding 3 to the external terminal 7 and the other side of the line 21. This causes relay 10 to pick up moving contacts 52 and 53 to their second positions, thus connecting the running winding 2 in circuit between the operating coil 12 of relay 10 and the external terminal 7 in the reverse sense. The circuit starting with the line 23 proceeds through switch 22 in its position 14, operating coil 12 of relay 10, contact 44 of relay 9 in its position 42, contact 53 of relay 10 in its second position 55, running winding 2, contact 52 of relay 10 in its second position 54 and the line 99 to external terminal 7 and the other side of the source 21. The motor now completes its reversal and comes up to speed in the opposite direction with the starting winding 3 being cut out of the circuit by the speed-responsive switch 17 when the cut-out speed of the motor is reached, with the motor then again running normally on its main winding.

Referring now to Fig. 3 in which like elements are again illustrated by like reference numerals, the single-phase induction motor 1 is again provided with running winding 2 and starting winding 3 having capacitor 5 connected in series therewith. Here, operating coils 11 and 12 of relays 9 and 10 are respectively connected in series with external terminals 13 and 14 and their ends 35 and 32 are respectively connected to positions 63 and 64 of contacts 65 and 66 associated respectively with relays 10 and 9. Thus, the operating coil 11 of relay 9 is connected to the position 63 of contact 65 of relay 10 while the operating coil 12 of relay 10 is connected to position 64 of contact 66 of relay 9. The movable elements 67 and 68 of contacts 65 and 66 are connected to line 69 which in turn is connected to starting contact 70 of switch 17 which, again, is actuated by speed-responsive mechanism 19 and shaft 20 of rotor 4. The position 71 of contact 65 of relay 10 is connected to side 25 of running winding 2 while the position 72 of contact 66 of relay 9 is connected to the side 24 of running winding 2. The relays 9 and 10 are also provided with additional contacts 73 and 74 respectively with position 75 of contact 73 being connected to side 25 of running winding 2 while position 76 of contact 74 is connected to the other side 24 of running winding 2. The movable element 77 of contact 74 is connected to line 99 which in turn is connected to external terminal 7 while the movable element 78 of contact 73 is connected to the position 79 of contact 74. The position 80 of contact 73 is connected to running contact 40 of switch 17.

In operation, with the selector switch 22 thrown to the position 13 to select one direction of rotation, instantaneous locked rotor current flows from the line 23 through the switch 22, the operating coil 11 of relay 9, the contact 65 in its position 63, the line 69, the starting contact 70 and movable element 18 of switch 17, capacitor 5 and the starting winding 3 to the external terminal 7 in the line 21. Operating coil 11 of relay 9 will thus be energized picking up the relay, moving contact 66 to its position 72. The running winding 2 will thus be energized by a circuit including selector switch 22, operating coil 11 of relay 9, contact 65 in its position 63, contact 66 in its position 72, the running winding 2, contact 73 in its position 75, contact 74 in its position 79, and the line 99 to the external terminal 7 and the other side of the line 21. When the cut-out speed of the switch 17 has been reached, the switch will move to its running contact 40 thus opening the circuit of the starting winding and removing it from the line, and the motor will continue to run normally on its running winding 2.

To reverse the motor while it is running, the switch 22 is moved to the position 14, thus de-energizing operating coil 11 of relay 9 causing this relay to drop out. No current will flow through the operating coil 12 of relay 10, however, since it must be energized either through contacts 65 and 74 or the speed-responsive switch 17. Since the relay 10 is not picked up it cannot be energized through contacts 65 and 74 and since the motor is running at or near normal speed, the switch 17 will be open. A regenerative braking circuit is thus established starting with the end 8 of the starting winding circuit through movable element 18 and running contact 40 of switch 17, contact 73 of relay 9 in its position 80, contact 74 of relay 10 in its position 79, line 99, starting winding 3, and capacitor 5 back to end 8 of the starting winding circuit. When the motor slows down to the cut-in speed of the switch 17, the switch will close movable element 18 to starting contact 70. A circuit is thus established from line 23 in switch 22 through operating coil 12 of relay 10, contact 66 of relay 9 in its position 64, line 69, switch 17, and capacitor 5 and starting winding 3 to the external terminal 7 on the other side of the line 21. Thus relay 10 picks up since operating coil 12 is energized and the running winding 2 is connected for energization through switch 22, operating coil 12, contact 66 of relay 9 in the position 64, contact 65 of relay 10 in its position 71, the running winding 2, contact 74 of relay 10 in its position 76, and line 99 to the external terminal 7 and the line 21. The motor now starts in the opposite direction and when the cut-out speed of switch 17 is reached, the switch will open again removing the starting winding from the circuit, leaving the motor running normally in the opposite direction with the running winding 2 connected in the opposite sense.

Referring now to Fig. 4 in which like parts are still indicated by like reference numerals, the motor 1 again is provided with running winding 2, starting winding 3 with serially connected capacitor 5 and squirrel cage rotor member 4. Here, operating coils 11 and 12 of current-responsive relays 9 and 10 are serially connected with external terminals 13 and 14 and have their ends 35 and 32 respectively connected to the positions 81 and 82 of contacts 83 and 84 associated with relays 10 and 9. The movable elements 85 and 86 of contacts 83 and 84 are connected to contact 87 of switch 17 which is again actuated by speed-responsive mechanism 19 on the shaft 20 of rotor 4. The positions 88 and 89 of contacts 83 and 84 are connected to the end 24 of running winding 2 and to movable contact 18 of switch 17, while the end 25 is connected to the external terminal 7 through line 90. The relays 9 and 10 are also provided with additional contacts 91 and 92 with their second positions 93 and 94 connected to the line 90 as at 95 and with their first positions 96 and 97 connected to a second starting contact 98 of the switch 17.

In operation, with the switch 22 thrown to the position 13 for the desired direction of rotation, a circuit is established from external line 23 through switch 22 in its position 13, operating coil 11 of relay 9, contact 83 of relay 10 in its position 81, starting contact 87, movable element 18 of switch 17, running winding 2, and line 90 to external terminal 7 and line 21. Relay 9 now picks up and a circuit is also established to energize starting winding 3 from line 23 through switch 22 in its position 13, operating coil 11 of relay 9, contact 83 of relay 10 in its position 81, contact 87, movable element 18, and contact 98 of switch 17, contact 91 of relay 9 in its position 97, capacitor 5 and the starting winding 3, contact 92 of relay 10 in its position 93, and the line 90 to the external terminal 7 and the external line 21. The motor will now start in the direction desired with running winding 2 and starting winding 3 energized and when the cut-out speed of switch 17 is reached, the switch will open moving the movable element 18 away from the stationary contacts 87 and 98. The running winding 2 remains energized, however, through a circuit starting with the line 23, switch 22 in its position 13, operating coil 11 of relay 9, contact 83 of relay 10 in its position 81, contact 84 of relay 9 in its position 89, the running winding 2, and line 90 to external terminal 7 and line 21.

When it is desired to reverse the motor, switch 22 is moved to its other position 14 causing operating coil 11 of relay 9 to be deenergized, thus dropping out the relay. Since for initial energization of operating coil 12 of relay 10, the speed-responsive switch 17 must be closed, the relay 10 will not pick up. However, a regenerative braking circuit is established starting with the end of the starting winding circuit through contact 91 of relay 9 in its position 94, contact 92 of relay 10 in its position 93, the starting winding 3, and the capacitor 5 back to the end 8 of the starting winding circuit. When the motor slows down to the cut-in speed of the switch 17, the switch will close, thus establishing a circuit to energize the running winding 2 starting with the line 23, switch 22 in its position 14, operating coil 12 of relay 10, contact 84 of relay 9 in its position 82, contact 87 and movable element 18 of switch 17, running winding 2, and the line 90 to the external terminal 7 in the line 21. The relay 10 will now pick up energizing the starting winding 3 in the reverse sense with a circuit from the line 23 and switch 22 in position 14 through operating coil 12 of relay 10, contact 84 of relay 9 in its position 82, contacts 87 and 98 and movable element 18 of switch 17, contact 92 of relay 10 in its first position 96, the starting winding 3, the capacitor 5, contact 91 of relay 9 in its position 94, and the line 90 to the external terminal 7 and external line 21. The motor now reverses and comes up to speed in the opposite direction with the starting winding 3 connected in the opposite sense and when the cut-out speed of the switch 17 has been reached, the starting winding circuit will again be opened with the motor running normally in the opposite direction. It will be readily understood that an induction motor will run in either direction from a single winding so it is merely necessary to connect either the running winding or the starting winding in an opposite sense to start the motor in one direction or the other; however, once started, of course, it makes no difference in which sense the running winding is connected.

It will be readily apparent that this improved instantly reversible motor arrangement provides a circuit in which only three external terminals are necessary, i. e., terminals 7, 13 and 14, so that in the event the switch 22 is physically removed from the motor 1, only three leads will be necessary to extend from the motor to the switch and line. This improved circuit permits instantaneous operation of the switch 22 and, responsive to such operation, the motor will be regeneratively braked and started in the opposite direction. The relays 9 and 10 in each case pick up on locked rotor current and hold in on main winding running current.

While I have shown and described particular embodiments of this invention, further modifications and improvements will occur to those skilled in the art. I desire it to be understood, therefore, that this invention is not limited to the forms shown and I intend in the appended claims to cover all modifications which do not depart from the spirit and scope of this invention.

What I claim as new and desire to secure by Letters Patent of the United States is:

1. An instantly reversible, self-starting, single-phase alternating current motor comprising a running winding circuit, a starting winding circuit including a starting winding and a reactive device for electrically displacing said starting and running windings for starting said motor, one of said winding circuits being adapted to be connected to one side of a source of alternating current, a pair of relays having their operating coils respectively arranged to be connected in circuit with one of said winding circuits, a single-pole double-throw switch connected to the other side of said source of alternating current and adapted selectively to connect said operating coils to said other side of said source of alternating current with the operating coil so selected and the winding circuit connected thereto being initially connected across said source of alternating current, and a switch in said starting winding circuit arranged to open the same responsive to a predetermined operating characteristic of said motor, each of said relays having contacts arranged to connect said running winding and the operating coil of the selected relay in circuit with said one side of said source whereby said running winding and the operating coil of the selected relay are energized after said switch opens said starting winding circuit, said relays respectively having contacts arranged to connect at least one of said windings in a regenerative braking circuit when neither of said relay operating coils is energized whereby said braking circuit is established when the other of said relay operating coils is selected to reverse said motor while said motor is running and before said switch closes said starting winding circuit.

2. An instantly reversible, self-starting, single-phase alternating current motor comprising a running winding, a starting winding circuit adapted to have one end thereof connected to one side of a source of alternating current and including a starting winding and a capacitor in series therewith for electrically displacing said starting and running windings for starting said motor, a pair of current-responsive relays having their operating coils respectively arranged to be connected to the other end of said starting winding circuit, a single-pole double-throw switch connected to the other side of said source of alternating current and adapted selectively to connect said operating coils to said other side of said source of alternating current with said selected operating coil and said starting winding circuit connected in series across said source of alternating current whereby said selected operating coil and said starting winding are initially energized, and a speed-responsive switch in series with said starting winding circuit and arranged to open the same responsive to a predetermined motor speed, each of said relays having contacts arranged to connect said running winding in parallel with said starting winding circuit responsive to energization of said selected relay operating coil whereby said running winding and the operating coil of said selected relay are energized after said switch opens said starting winding circuit, at least one of said relays having contacts arranged to connect at least one of said windings in a regenerative braking circuit when neither of said relay operating coils is energized whereby said braking circuit is established when the other of said relay operating coils is selected to reverse said motor while said motor is running and before said switch closes said starting winding circuit.

3. An instantly reversible, self-starting, single-phase alternating current motor comprising a running winding, a starting winding circuit adapted to have one end thereof connected to one side of a source of alternating current and including a starting winding and a capacitor in series therewith for electrically displacing said starting and running windings for starting said motor, a pair of current-responsive relays having their operating coils respectively connected to the other end of said starting winding circuit, a single-pole double-throw switch connected to the other side of said source of alternating current and adapted selectively to connect said operating coils to said other side of said source of alternating current with said selected operating coil and said starting winding circuit connected in series across said source of alternating current whereby said selected operating coil and said starting winding are initially energized, and a speed-responsive switch in series with said starting winding circuit and arranged to open the same responsive to a predetermined motor speed, each of said relays having contacts arranged to connect said running winding in parallel with said starting winding circuit responsive to energization of said selected relay operating coil whereby said running winding and the operating coil of said selected relay are energized after said switch opens said starting winding circuit, said contacts connecting one of said windings in one sense when one of said relay operating coils is energized and in the other sense when the other of said relay operating coils is energized whereby said motor is reversed, at least one of said relays having contacts arranged to connect at least one of said windings in a regenerative braking circuit when neither of said relay operating coils is energized whereby said braking circuit is established when the other of said relay operating coils is selected to reverse said motor while said motor is running and before said switch closes said starting winding circuit.

4. An instantly reversible, self-starting, single-phase alternating current motor comprising a running winding, a starting winding circuit adapted to have one end thereof connected to one side of a source of alternating current and including a starting winding and a capacitor in series therewith for electrically displacing said starting and running windings for starting said motor, a pair of current-responsive relays having their operating coils respectively connected to the other end of said starting winding circuit, a single-pole double-throw switch connected to the other side of said source of alternating current and adapted selectively to connect said operating coils to said other side of said source of alternating current with said selected operating coil and said starting winding circuit connected in series across said source of alternating current whereby said selected operating coil and said starting winding are initially energized, and a speed-responsive switch in series with said starting winding circuit and arranged to open the same responsive to a predetermined motor speed, each of said relays having contacts arranged to connect said running winding in parallel with said starting winding circuit responsive to energization of said selected relay operating coil whereby said running winding and the operating coil of said selected relay are energized after said switch opens said starting winding circuit, said contacts connecting said running winding in one sense when one of said relay operating coils is energized and in the other sense when the other of said relay operating coils is energized whereby said motor is reversed, at least one of said relays having contacts arranged to connect at least one of said windings in a regenerative braking circuit when neither of said relay operating coils is energized whereby said braking circuit is established when the other of said relay operating coils is selected to reverse said motor while said motor is running before said switch closes said starting winding circuit.

5. An instantly reversible, self-starting, single-phase alternating current motor comprising a running winding, a starting winding circuit adapted to have one end thereof connected to one side of a source of alternating current and including a running winding and a capacitor in series therewith for electrically displacing said starting and running windings for starting said motor, a pair of relay circuits respectively connected to the other end of said starting winding circuit, each including a relay with a serially connected operating coil, a single-pole double-throw switch connected to the other side of said source of alternating current and adapted selectively to connect said operating coils to said other side of said source of alternating current with the operating coil of the relay circuit so selected and said starting winding circuit serially connected across said source of alternating current, and switch means in said starting winding circuit for opening the same responsive to a predetermined motor operating characteristic, one of said relays having contacts connected in circuit with said running winding and arranged to establish a circuit with said running winding connected to the operating coil of said one relay and to said one side of said source of alternating current in one sense responsive to energization of said one relay, said contacts being arranged to establish a second circuit with said running winding connected to the operating coil of the other of said relays and to said one side of said source of alternating current in the reverse sense when said one relay is not energized, said other relay having a contact connected in said second circuit and arranged to close the same responsive to energization of said other relay, said contacts of said one relay and said other relay being arranged to connect at least one of said windings in a regenerative braking circuit when neither of said relays is energized and said switch is open whereby said braking circuit is established when a change in selection of relay circuits is made to reverse said motor while said motor is running.

6. An instantly reversible, self-starting, single-phase alternating current motor comprising a running winding, a starting winding circuit adapted to have one end thereof connected to one side of a source of alternating current and including a starting winding and a capacitor in series therewith for electrically displacing said starting and running windings for starting said motor, a pair of relay circuits each including a relay with a serially connected operating coil, a single-pole double-throw switch connected to the other side of said source of alternating current and adapted selectively to connect said operating coils to said other side of said source of alternating current for energizing the same, and a speed-responsive switch having contacts arranged to connect said relay circuits to said starting winding circuit below a predetermined speed with the relay operating coil of the selected relay circuit and said starting winding circuit connected in series across said source of alternating current below the predetermined speed, said switch being arranged to open both of said relay circuits breaking said last-named connection at a predetermined speed, one of said relays having a pair of contacts respectively connected to the ends of said running winding and arranged to establish a circuit connecting said running winding between the operating coil of said one relay and said one side of said source of alternating current in one sense responsive to energization of said one relay, said contacts being arranged to establish a second circuit connecting said running winding in the opposite sense between the operating coil of the other of said relays and said one side of said source of alternating current when said one relay is not energized, said other relay having a contact connected in said second circuit and arranged to close the same responsive to energization of said other relay, said switch having a running contact arranged with said other relay contact and said one relay contact to establish a regenerative braking circuit when neither of said relays is energized and said motor is running with said running winding and said starting winding circuit being connected in a loop circuit whereby said braking circuit is established when a change in selection of relay circuits is made while said motor is running.

7. An instantly reversible, self-starting, single-phase alternating current motor comprising a running winding, a starting winding circuit adapted to have one end thereof connected to one side of a source of alternating current and including a starting winding and a capacitor in series therewith for electrically displacing said starting and running windings for starting said motor, a pair of relay circuits each including a relay with a serially connected operating coil, a single-pole double-throw switch connected to the other side of said source of alternating current and adapted selectively to connect said operating coils to said other side of said source of alternating current for energizing the same, each of said relay circuits being connected to a contact of the relay of the other of said relay circuits, said contacts respectively connecting each of said relay circuits to said starting winding circuit when the other of said relays is not energized with the relay operating coil of the selected relay circuit and said starting winding circuit connected in series across said source of alternating current, and a switch in said starting winding circuit arranged to open the same responsive to a predetermined motor operating characteristic, one of said relays having additional contacts connected in circuit with said running winding and arranged to establish a circuit with said running winding connected to the operating coil of said one relay and to said one side of said source of alternating current in one sense responsive to energization of said one relay, said additional contacts being arranged to establish a second circuit with said running winding connected to the operating coil of the other of said relays and said one side of said source of alternating current in the reverse sense when said one relay is not energized, said other relay having an additional contact connected in said second circuit arranged to close the same responsive to energization of said other relay, said contacts of said one relay and said other relay being arranged to connect at least one of said windings in a regenerative braking circuit when neither of said relays is energized and said switch is open whereby said braking circuit is established when a change in selection of relay circuits is made to reverse said motor while said motor is running.

8. An instantly reversible, self-starting, single-phase alternating current motor comprising a running winding, a starting winding circuit adapted to have one end thereof connected to one side of a source of alternating current and including a starting winding and a capacitor in series therewith for electrically displacing said starting and running windings for starting said motor, a pair of relay circuits each including a relay with a serially connected operating coil, a single-pole double-throw switch connected to the other side of said source of alternating current and adapted selectively to connect said operating coils to said other side of said source of alternating current for energizing the same, each of said relay circuits being connected to a contact of the relay of the other of said relay circuits, a first circuit connecting said contacts to said starting winding circuit, said contacts respectively connecting each of said relay circuits to said first circuit when the other of said relays is not energized with the relay operating coil of the selected relay circuit and said starting winding circuit connected in series across said source of alternating current, and a speed-responsive switch in said starting winding circuit arranged to open the same responsive to a predetermined motor speed, one of said relays having a pair of additional contacts connected in circuit with said running winding and arranged to establish a second circuit with said running winding connected to said first circuit and to said one side of said source of alternating current in one sense responsive to energization of said one relay, said additional contacts being arranged to establish a third circuit with said running winding connected to said first circuit and to said one side of said source of alternating current in the reverse sense when said one relay is not energized, said other relay having an additional contact connected in said third circuit and arranged to close the same responsive to energization of said other relay, said speed-responsive switch having a running contact arranged with said additional contacts of said one of the other relays to establish a regenerative braking circuit when neither of said relays is energized and said motor is running above said predetermined speed with said running and said starting winding circuit being connected in a loop circuit whereby said braking circuit is established when a change in selection of relay circuits is made while said motor is running.

9. An instantly reversible, self-starting, single-phase alternating current motor comprising a running winding, a starting winding circuit adapted to have one end thereof connected to one side of a source of alternating current and including a starting winding and a capacitor in series therewith for electrically displacing said starting and running windings for starting said motor, a pair of relay circuits each including a relay with a serially connected operating coil, a single-pole double-throw switch connected to the other side of said source of alternating current and adapted selectively to connect said operating coils to said other side of said source of alternating current for energizing the same, each of said relay circuits being connected to a contact of the relay of the other of said relay circuits, said contacts respectively having first positions connecting said relay circuits to said starting winding circuit when said relays are not energized with the relay operating coil of the selected relay circuit and said starting winding circuit initially connected in series across said source of alternating current, and a switch in said starting winding circuit arranged to open the same responsive to a predetermined motor operating characteristic, said contacts having second positions respectively connected to the ends of said running winding whereby the operating coil of the selected relay circuit is connected to one end of said running winding responsive to energization of said last-named operating coil, one of said relays having an additional contact connected to said one side of said source of alternating current and arranged to connect one end of said running winding thereto when said one relay is energized, said additional contact establishing a circuit connecting the other end of said running winding to said one side of said source of alternating current when said one relay is not energized, the other of said relays having an additional contact arranged to close said last-named circuit responsive to energization of said other relay, said additional contacts of both of said relays being arranged to connect at least one of said windings in a regenerative braking circuit when neither of said relays is energized and said switch is open whereby said braking circuit is established when a change in selection of relay circuits is made while said motor is running.

10. An instantly reversible, self-starting, single-phase alternating current motor comprising a running winding, a starting winding circuit adapted to have one end thereof connected to one side of a source of alternating current and including a starting winding and a capacitor in series therewith for electrically displacing said starting and running windings for starting said motor, a pair of relay circuits each including a relay with a serially connected operating coil, a single-pole double-throw switch connected to the other side of said source of alternating current and adapted selectively to connect said operating coils to said other side of said source of alternating current for energizing the same, each of said relay circuits being connected to a contact of the relay of the other of said relay circuits, said contacts respectively having first positions connecting said relay circuits to said starting winding circuit when said relays are not energized with the relay operating coil of the selected relay circuit and said starting winding circuit initially connected in series across said source of alternating current, and a speed-responsive switch in said starting winding circuit arranged to open the same responsive to a predetermined motor speed, said contacts having second positions respectively connected to the ends of said running winding whereby the operating coil of the selected relay circuit is connected to one end of said running winding responsive to energization of said last-named operating coil, one of said relays having an additional contact connected to said one side of said source of alternating current and arranged to connect one end of said running winding thereto when said one relay is energized, said additional contact establishing a circuit connecting the other end of said running winding to said one side of said source of alternating current when said one relay is not energized, the other of said relays having an additional contact arranged to close said last-named circuit responsive to energization of said other relay, said speed-responsive switch having a running contact arranged with said additional contacts of both of said relays to connect said starting winding in a regenerative braking circuit when neither of said relays is energized and said motor is running above said predetermined speed whereby said braking circuit is established when a change in the selection of relay circuits is made while said motor is running.

11. An instantly reversible, self-starting, single-phase alternating current motor comprising a running winding adapted to have one end thereof connected to one side of the source of alternating current, a starting winding circuit including a starting winding and a capacitor in series therewith for electrically displacing said starting and running windings for starting said motor, a pair of relay circuits each including a relay with a serially connected operating coil, a single-pole double-throw switch connected to the other side of said source of alternating current and adapted selectively to connect said operating coils to said other side of said source of alternating current for energizing the same, each of said relay circuits being connected to a contact of the relay of the other of said relay circuits, said contacts having first positions establishing a first circuit connecting said relay circuits to the other end of said running winding when said relays are not energized with the relay operating coil of the selected relay circuit and said running winding initially connected in series across said source of alternating current, and a switch in said first circuit and arranged to open the same responsive to a predetermined motor characteristic, said contacts having second positions connected to said other end of said running winding whereby said running winding is sealed-in responsive to energization of the selected relay circuit, each of said relays having an additional contact, said starting winding circuit being connected across the additional contacts, said additional contacts having first positions connected to said one side of said source of alternating current when said relays are not energized and second positions connected to said other side of said running winding when said relays are energized, said switch being arranged to open said connection responsive to said predetermined speed, said additional contacts of both the said relays in their first positions connecting said starting winding circuit in a regenerative braking circuit when neither of said relays is energized and said switch is open whereby said braking circuit is established when a change in selection of relay circuits is made while said motor is running.

12. An instantly reversible, self-starting, single-phase alternating current motor comprising a running winding adapted to have one end thereof connected to one side of the source of alternating current, a starting winding circuit including a starting winding and a capacitor in series therewith for electrically displacing said starting and running windings for starting said motor, a pair of relay circuits each including a relay with a serially connected operating coil, a single-pole double-throw switch connected to the other side of said source of alternating current and adapted selectively to connect said operating coils to said other side of said source of alternating current for energizing the same, each of said relay circuits being connected to a contact of the relay of the other of said relay circuits, said contacts having first positions establishing a first circuit connecting said relay circuits to the other end of said running winding when said relays are not energized with the relay operating coil of the selected relay circuit and said running winding initially connected in series across said source of alternating current, and a speed-responsive switch in said first circuit and arranged to open the same responsive to a predetermined motor speed, said contacts having second positions connected to said other end of said running winding whereby said running winding is sealed-in responsive to energization of the selected relay circuit, each of said relays having an additional contact, said starting winding circuit being connected across said additional contacts, said additional contacts having first positions connected to said one side of said source of alternating current when said relays are not energized and second positions connected to said other side of said running winding when said relays are energized, said switch being arranged to open said connection responsive to said predetermined speed, said additional contacts of both the said relays in their first positions connecting said starting winding circuit in a regenerative braking circuit when neither of said relays is energized and said switch is open whereby said regenerative braking circuit is established when a change in selection of relay circuits is made while said motor is running.

DONALD C. REEK.

References Cited in the file of this patent
UNITED STATES PATENTS

| Number | Name | Date |
| --- | --- | --- |
| 2,195,287 | Schaefer | Mar. 26, 1940 |
| 2,213,892 | West | Sept. 3, 1940 |
| 2,263,324 | Wiest | Nov. 18, 1941 |
| 2,285,687 | Synder | June 9, 1942 |
| 2,407,117 | Warner | Sept. 3, 1946 |
| 2,580,242 | Reek | Dec. 25, 1951 |